No. 11,920. Reissued July 2, 1901.
O. H. & A. F. PIEPER.
DENTAL ENGINE.
(Application filed Oct. 17, 1898.)
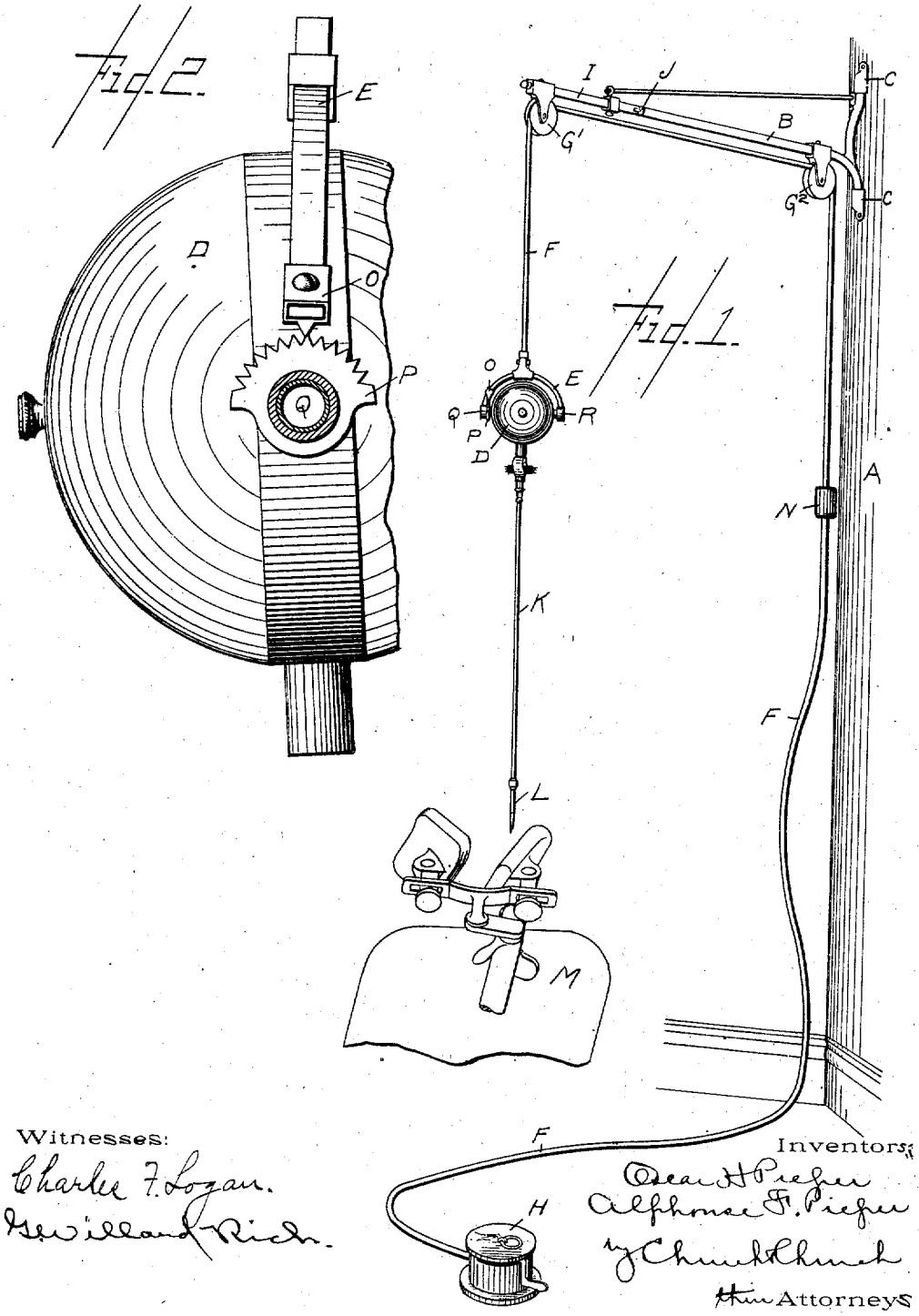
Witnesses:
Charles F. Logan.
Geo. Willard Rich.
Inventors:
Oscar H. Pieper
Alphonse F. Pieper
by Church & Church
their Attorneys
THE NORRIS PETERS CO., WASHINGTON, D. C.

UNITED STATES PATENT OFFICE.

OSCAR H. PIEPER AND ALPHONSE F. PIEPER, OF ROCHESTER, NEW YORK.

DENTAL ENGINE.

SPECIFICATION forming part of Reissued Letters Patent No. 11,920, dated July 2, 1901.

Original No. 562,742, dated June 23, 1896. Application for reissue filed October 17, 1898. Serial No. 693,814.

*To all whom it may concern:*

Be it known that we, OSCAR H. PIEPER and ALPHONSE F. PIEPER, citizens of the United States, and formerly residing at San Jose, California, but now residing at Rochester, in the county of Monroe and State of New York, have invented certain new and useful Improvements in Dental Apparatus; and we hereby declare that the specification and drawings hereto attached constitute a complete description of our improvements and of the manner of constructing and applying the same.

Our invention relates to dental apparatus employing motive power to operate various implements, and to the method of arranging such motive power and the elements of transmission to secure convenience and celerity in the various operations to be performed.

Our improvements consist in the construction, arrangement, and combination of parts, substantially as will be hereinafter described and claimed.

Referring to the drawings herewith, illustrating the manner of applying our invention, Figure 1 shows a motive apparatus mounted according to our invention. Fig. 2 is an enlarged partial side view of the motor in a plane opposite to Fig. 1.

Similar letters of reference are employed to designate like parts in the two figures of the drawings.

Referring to the drawings, A is a wall, to which the swinging bracket B is attached by the pivotal bearings C C.

D is an electric motor inclosed in a spherical case and made in accordance with our application for Letters Patent, Serial No. 509,585, filed April 30, 1894, for improvements in electrical apparatus for operating dental implements; but such a motor can be of any form or nature that admits of suspension in a similar manner. This motor D we support in a gimbal-frame E, which is suspended by a cord or cable F, which contains the conducting-wires, passing over the pulleys G' $G^2$, down along the wall A, and to a rheostat H, the latter so arranged as to be controlled by the foot of an operator.

Through the cable or cord F and the gimbal-frame E pass the required wires for conducting electrical current and controlling the movements of the motor D, entering through the axes Q or R, or both, in the usual manner.

The bracket B is made in two parts, having a telescopic section I, that can be moved out or in, and fastened in any required position by means of a screw J, so the flexible driving-shaft K and the implements L can be brought over or to either side of a dental chair M, as seen in Fig. 1.

On the cable or cord F we place a counterweight N, that balances or partially balances the motor D, so the latter will remain after adjustment at various heights from the chair M.

When the flexible shaft or transmission-tube K is to be led off at an angle or horizontally in respect to the motor D, we provide a latch or detent O, that slides on the gimbal-frame E and engages a notched sector P, attached to the motor D, so the latter can be fixed in various positions or at different angles, as seen in Fig. 2.

The constructive details of the motor D, the flexible shaft K, dental implements L, and the rheostat H being set forth in our application for Letters Patent hereinbefore cited and in our application for Letters Patent, Serial No. 509,584, filed April 30, 1894, in electrical controlling apparatus for motors, no further description of these elements is required here.

We claim as our invention—

1. In a dental apparatus, the combination of an implement-operating motor having an axis, a frame in which the axis is adjustably supported, a counterweighted cable on which the frame is suspended so as to be vertically adjustable, and means for holding the motor in any position to which it may be adjusted about its axis, substantially as described.

2. In a dental apparatus, the combination of the motor, the gimbal-frame in which it is supported, the suspending rope or cable attached to the gimbal-frame, the movable bracket having pulleys for the said rope or cable, a counterweight on the rope, substantially as described.

3. In a dental apparatus, a suspended motor, a gimbal-frame holding the same, to permit it to be adjustable about its own axis, and a latch or detent to hold the motor in the various positions to which it may be adjusted together with means for engaging the latch or detent, substantially as described.

4. In a dental apparatus, the combination of an implement-operating motor having a horizontal axis, a gimbal-frame supporting it, a rope or cable attached to the said frame, a notched sector on the motor, and a sliding detent on the frame that engages the sector, substantially as described.

5. In a dental apparatus, the combination with the implement-operating electric motor having a horizontal axis, the gimbal-frame in which said motor is pivoted on its axis, and a single, vertically-extending suspending-cable attached to the center of the frame, substantially as described.

6. In a dental apparatus, the combination with the implement-operating electric motor, having the horizontal trunnions or axes, the gimbal frame or yoke E in which said axes are pivoted, and the suspending-cable attached centrally to the frame, and containing the electric conductors, said conductors passing to the motor through the axes thereof and through the gimbal-frame, substantially as described.

OSCAR H. PIEPER.
ALPHONSE F. PIEPER.

Witnesses:
F. F. CHURCH,
G. WILLARD RICH.